(12) United States Patent
Kondo

(10) Patent No.: US 7,239,473 B2
(45) Date of Patent: Jul. 3, 2007

(54) TAPE GUIDE MECHANISM OF MAGNETIC RECORDING REPRODUCING DEVICE

(75) Inventor: Yasuhiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 60 days.

(21) Appl. No.: 10/510,703

(22) PCT Filed: Apr. 16, 2003

(86) PCT No.: PCT/JP03/04849

§ 371 (c)(1), (2), (4) Date: Oct. 15, 2004

(87) PCT Pub. No.: WO03/088237

PCT Pub. Date: Oct. 23, 2003

(65) Prior Publication Data

US 2005/0094310 A1 May 5, 2005

(30) Foreign Application Priority Data

Apr. 17, 2002 (JP) .............................. 2002-115366

(51) Int. Cl.
*G11B 5/027* (2006.01)
(52) U.S. Cl. ....................................................... 360/85
(58) Field of Classification Search ..................... None
See application file for complete search history.

(56) References Cited

U.S. PATENT DOCUMENTS 4,642,713 A * 2/1987 Ohira et al. ................... 360/85

FOREIGN PATENT DOCUMENTS

JP 2000-90523 3/2000

* cited by examiner

*Primary Examiner*—David Davis
(74) *Attorney, Agent, or Firm*—Oblon, Spivak, McClelland, Maier & Neustadt, P.C.

(57) ABSTRACT

A tape guide mechanism in a magnetic recording and reproducing apparatus is provided; the magnetic recording and reproducing apparatus includes a movable chassis 1 having a tape guide arm member 30 on which a tape guide 31 is erected and a pair of reels stands thereon and a fixed chassis 2 having a magnetic rotary head thereon, in which the movable chassis 1 moves to one position of said fixed chassis 2 to perform loading and unloading of a cassette and when moves to the other position, tape loading of taking out a magnetic tape from the reel of the loaded cassette to be wound around the magnetic rotary head is performed, wherein after completing the tape loading, the tape guide 31 is fixed to a predetermined position by a guide receiving member 40 that is provided on the fixed chassis 2 to receive the tape guide 31, and in the middle of the tape guide 31 traveling to said predetermined position, the tape guide arm member 30 is made to move along a groove 2a provided in the fixed chassis 2 to determine the position in the chassis plane direction and is guided and moved by the projections 36 provided on the lower surface of the tape guide arm member 30 to determine the position in the height direction.

4 Claims, 11 Drawing Sheets

TAPE GUIDE MECHANISM OF MAGNETIC RECORDING REPRODUCING DEVICE

TECHNICAL FIELD

The present invention relates to a tape guide mechanism of a magnetic recording and reproducing apparatus when, for example, magnetic tape is loaded.

BACKGROUND ART

First, an example of a magnetic recording and reproducing apparatus will be explained referring to FIGS. 1 and 2.

FIG. 1 shows a linear skating type mechanical deck in a magnetic recording and reproducing apparatus for DV (Digital Video) formatting, for example, and indicates a state in which a movable chassis 1 has moved from a fixed chassis 2 to a position where a cassette can be detached (unloading position). Also, FIG. 2 shows a state in which the movable chassis 1 has slid and moved to a position where magnetic tape (not shown) is loaded onto a magnetic rotary head 8.

In FIG. 1, numeral 1 denotes a U-shaped movable chassis, to which pop-up type cassette compartments not shown in the figure are attached on both sides in order for a cassette to be lifted and removed easily, for example, when the cassette is loaded/unloaded. Further, the movable chassis includes a pair of reel stands 3 and 4 for supplying and taking up tape, and is provided with a reel stand cover plate 5 that covers other mechanical portions than the reel stands 3 and 4, on which a tape-end sensor light emitting portion 6, a reel-brake release projection 7 and the like are provided.

Further, as shown in FIG. 2, the magnetic rotary head 8 and a capstan 9 are provided on the fixed chassis 2, and on a guide plate 10 around the magnetic rotary head 8, guide-receiving grooves 11 and 12 are provided. The movable chassis 1 slides and moves on the fixed chassis 2 by making sliding pins 16 and 16 provided on one side surface of the U-shaped portion slide and move in slide grooves 15 and 15 provided on one side surface of the fixed chassis 2 by means of a loading gear not shown.

Each of guide rollers 13b and 13e on supplying and taking up sides provided around the magnetic rotary head 8 moves along the slide grooves 11 and 12 respectively, and when tape loading is completed, the rollers are fixed firmly to function as tape guides so that tape runs stably with respect to the magnetic rotary head 8. Further, on the mechanical deck, for example, a tape guide 13a and a slanted guide 13c are provided on the supplying side, and a slanted guide 13d, a pinch roller 9b, a tape guide 17 and other mechanisms are provided on the taking up side as other guide mechanisms, so that when loading tape, those guide mechanisms move together with the movable chassis 1 and are fixed at a predetermined position for the stable running of the tape.

As shown in FIG. 3, when a cassette 18 is loaded, those guide portions constitute a tape path system, in which a magnetic tape 19 pulled out from a providing side reel 3a is helically wound around the magnetic rotary head 8 through the tape guide 13a, a tension regulator 14, the guide roller 13b, and the slanted guide 13c; and then the magnetic tape is taken up by a taking up side reel 4a through the slanted guide 13d, the guide roller 13e, a capstan shaft 9a, the pinch roller 9b, and finally the tape guide 17.

As understood from FIG. 3, the tape guide 17 on the taking up side directly functions as the tape guide for the taking up side reel 4a. If taking-up of magnetic tape to a reel is not stably performed, the magnetic tape is contacted with a reel flange to be creased, damaged, or deteriorated due to the fact that force may not equally be applied to the whole width of the magnetic tape and so on. Accordingly, in order to maintain a favorable condition of the magnetic tape 19, it is important to maintain the height of the tape guide 17 and verticality or predetermined slant thereof with respect to the movable chassis 1 irrelevant to the diameter of the taking up side reel 4a around which the tape is wound, so that the magnetic tape 19 is constantly wound up to be a predetermined height by the taking up side reel stand 4 without a problem.

FIG. 4 shows an example of a conventional tape guide mechanism and FIG. 5 shows the cross section thereof.

On a tape guide arm member 20 constituting the tape guide mechanism, the tape guide 17 is erected and also two shafts are vertically provided, in which a rotary fulcrum shaft of the tape guide arm member 20 is constructed for accurate rotation such that a fulcrum shaft 21 that is one of the shafts vertically provided on the tape guide arm member 20 is inserted to be engaged with a long bearing boss 24 fixed to the movable chassis 1 by caulking. The upper surface of the fulcrum shaft 21 is covered with the reel stand cover plate 5.

Further, a cam shaft 22 that is the other of the shafts vertically provided on the tape guide arm member 20 acts together with the movable chassis 1 and moves in a guide groove 23 of the fixed chassis 2 and in a rotation groove 22a.

The posture (trace) of the tape guide 17 and the tape guide arm member 20 in the middle of tape loading or when tape loading is completed is determined by the rotation fulcrum shaft 21 of the tape guide arm member 20 and the bearing boss 24 of the fixed chassis 2.

Further, the tape guide arm member 20 is forced in the counterclockwise direction (indicated by an arrow in the drawing) by a spring means such as a spring not shown. In addition, the height can be adjusted using a screwdriver or the like for a concave portion 17a with a groove on top of the tape guide 17. Numeral 17b denotes a spring means of an auxiliary component for adjusting the height.

As heretofore described, in order for the magnetic tape 19 to travel stably, the tape guide 17 is required to be accurately fixed at a predetermined position on the movable chassis 1, and accurate assembly is needed to obtain the above required position, when the bearing boss 24 is fixed to the movable chassis 1 by caulking, for example.

Further, the tape guide 17 requires accurate height adjustment and a bearing component with high accuracy is required at, for example, the rotation fulcrum portion of the tape guide arm member 20. Specifically, difference between the outer diameter of the fulcrum shaft 21 and the inner diameter of the fulcrum bearing boss 24 shown in FIG. 5 is made small. The difference of dimensions between the fulcrum shaft 21 and the bearing boss 24 when engaged with each other is approximately 0 to several ten µm conventionally, and the length for receiving a shaft (fulcrum shaft inserting length) is obtained as long as possible to restrain an inclination, so that the tape guide arm member 20 can be made to move horizontally, preventing the tape guide 17 erected on the end thereof from falling down.

However, highly sophisticated technology is required to obtain such accurate bearing component and engagement accuracy between the outer diameter of the fulcrum shaft and the inner diameter of the bearing component, which results in the problem of high cost.

Furthermore, to obtain the shaft receiving length as long as possible, there occurs such a problem that no other component can be arranged in the space in which the bearing moves around, in other words, no flexibility is available for design in the height direction of the mechanical deck.

DISCLOSURE OF THE INVENTION

In light of the above problems, the present invention provides a tape guide mechanism of a magnetic recording and reproducing apparatus, in which the structure of a rotation fulcrum portion including a fulcrum shaft of a tape guide arm member, a bearing portion of a movable chassis and the like is simplified, thereby improving the design flexibility in the height direction.

A first aspect of the present invention is a mechanism in a magnetic recording and reproducing apparatus including a movable chassis on which a tape guide arm member having a tape guide erected thereon and a pair of reel stands are mounted and a fixed chassis on which a magnetic rotary head is mounted, in which when the movable chassis moves to one position of the fixed chassis, a cassette is loaded and unloaded and when the movable chassis moves to the other position, a tape loading operation of extracting magnetic tape from a reel of the cassette loaded to be wound around the magnetic rotary head is performed; wherein after completing the tape loading operation, the tape guide is fixed at a predetermined position by means of a guide receiving member having a guide receiving portion provided on the fixed chassis to receive the tape guide, and in the middle of the movement of the tape guide to the predetermined position, the tape guide arm member is moved along a groove provided on the fixed chassis to determine a position in the plane direction and is guided and moved by a projection provided on the lower surface of the tape guide arm member to determine a position in the height direction.

A second aspect of the present invention is a mechanism in a magnetic recording and reproducing apparatus according to the first aspect of the present invention, in which the tape guide is fixed at the predetermined position by means of the guide receiving portion using tension of the magnetic tape loaded onto the tape guide.

According to the above described mechanism, since the posture of the tape guide is fixed when tension of the tape is applied to the tape guide, accuracy of the posture of the tape guide is not required in the middle of tape loading, so that the structure of the rotation fulcrum portion of the tape guide arm member can be simplified. Further, with the simplified structure of the rotation fulcrum portion a bearing need not be long, so that the flexibility in design in the height direction is improved.

A third aspect of the present invention is a mechanism in a magnetic recording and reproducing apparatus according to the first aspect of the present invention, in which the tape guide is fixed at the predetermined position by means of the guide receiving portion using tension of the magnetic tape loaded onto the tape guide; the guide receiving portion has a groove to receive the tape guide arm member and is provided with a projection on the lower surface thereof; and when tension of the magnetic tape loaded onto the tape guide is applied, the upper surface of the tape guide arm member is brought in contact with the projection on the lower surface of the guide receiving portion to fix the tape guide to a predetermined position.

According to the above described construction, when tension is applied to the tape guide, the upper surface of the tape guide arm member is brought in contact with the projection on the lower surface of the guide receiving portion to fix the tape guide at a predetermined position, so that the tape guide can be fixed at the predetermined position with a simplified structure.

BEST MODE FOR CARRYING OUT THE INVENTION

Figure 1:
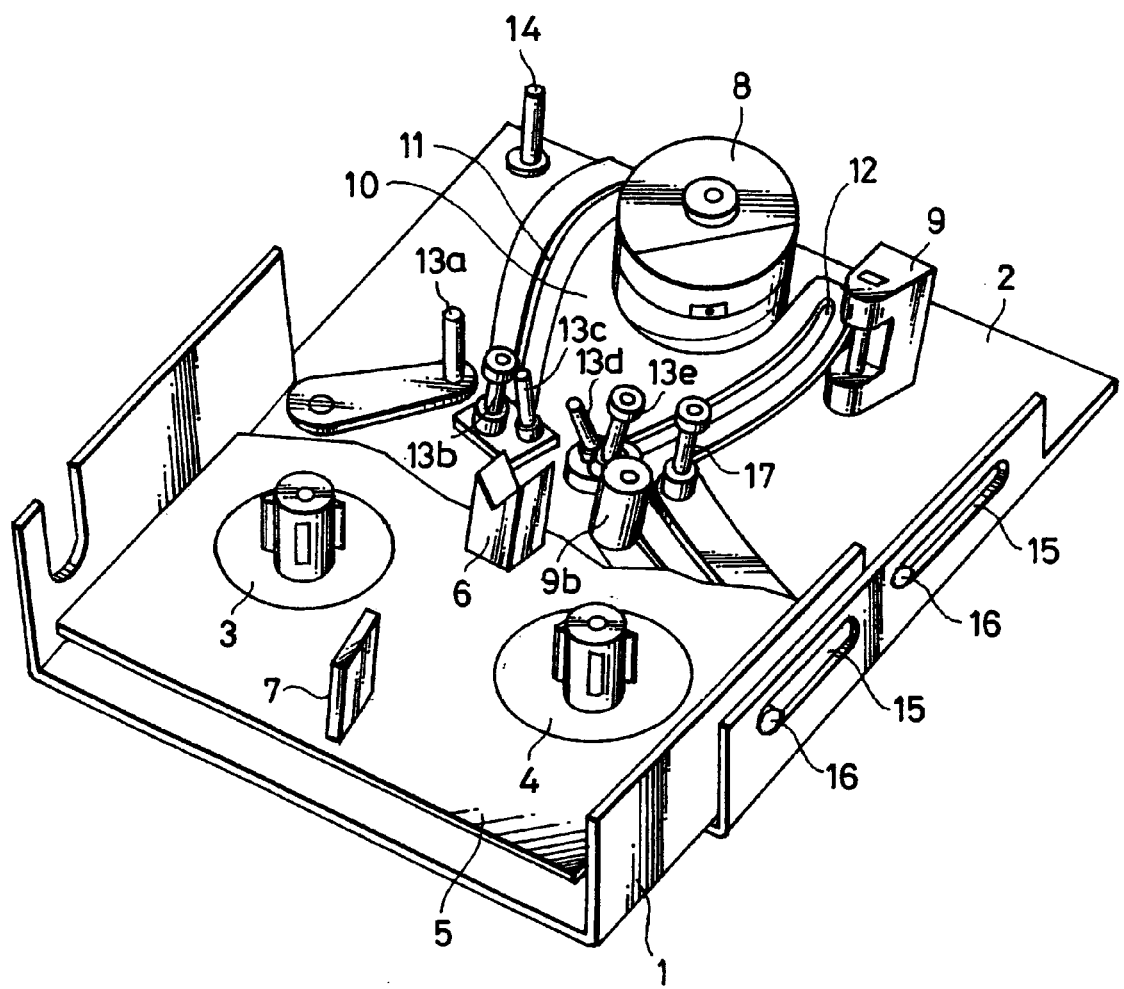
FIG. 1 is a perspective view showing a magnetic recording and reproducing apparatus when a cassette is loaded/unloaded.
Figure 2:
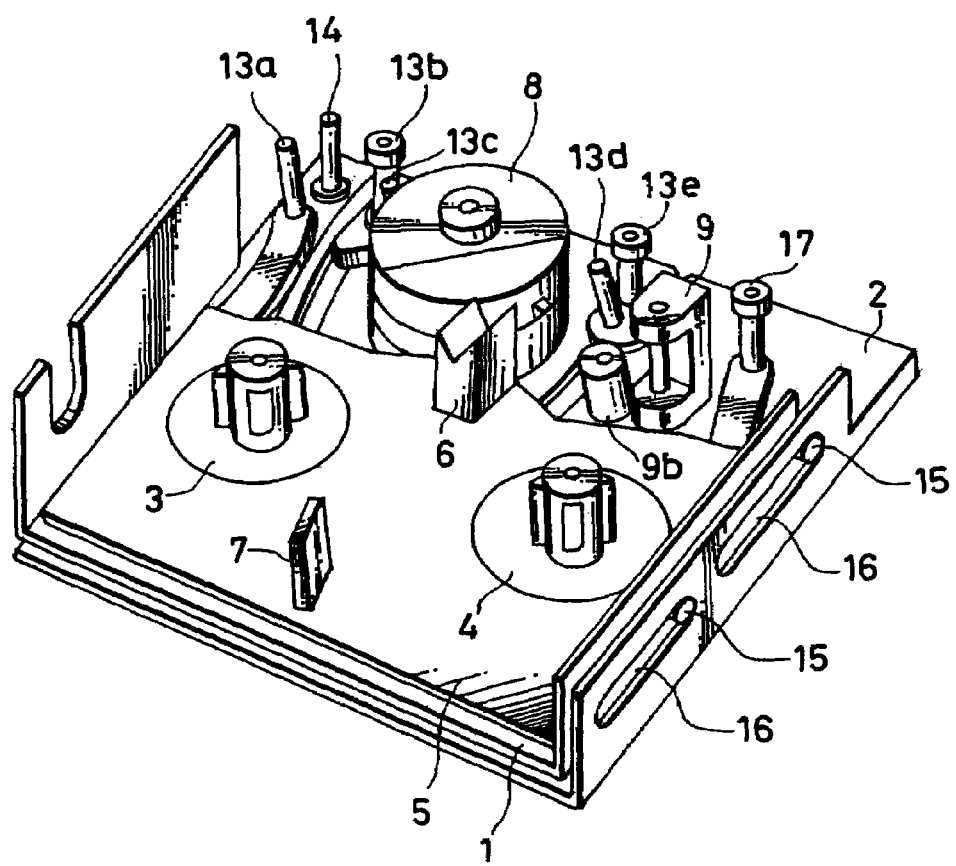
FIG. 2 is a perspective view showing a magnetic recording and reproducing apparatus in the middle of tape loading.
Figure 3:
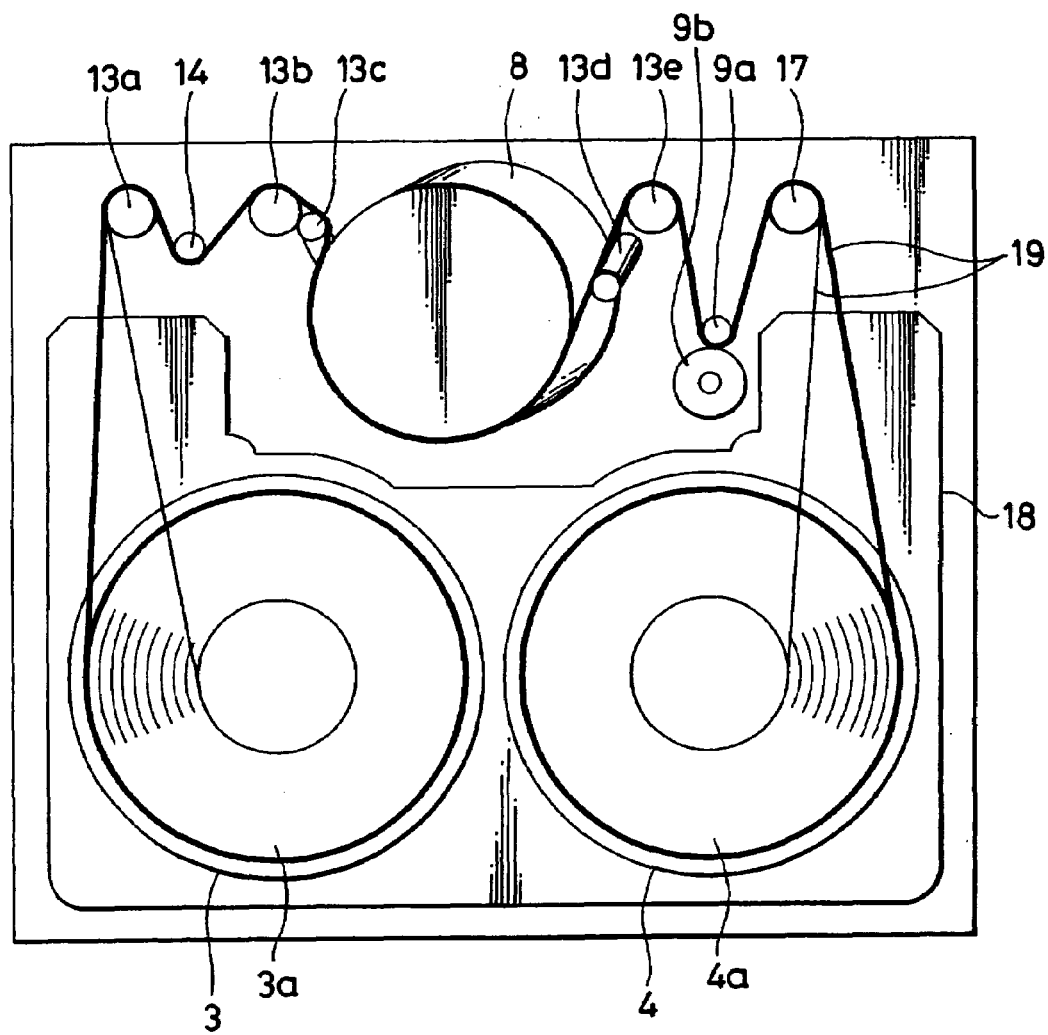
FIG. 3 is a diagram showing a tape path system of a magnetic recording and reproducing apparatus.
Figure 4:
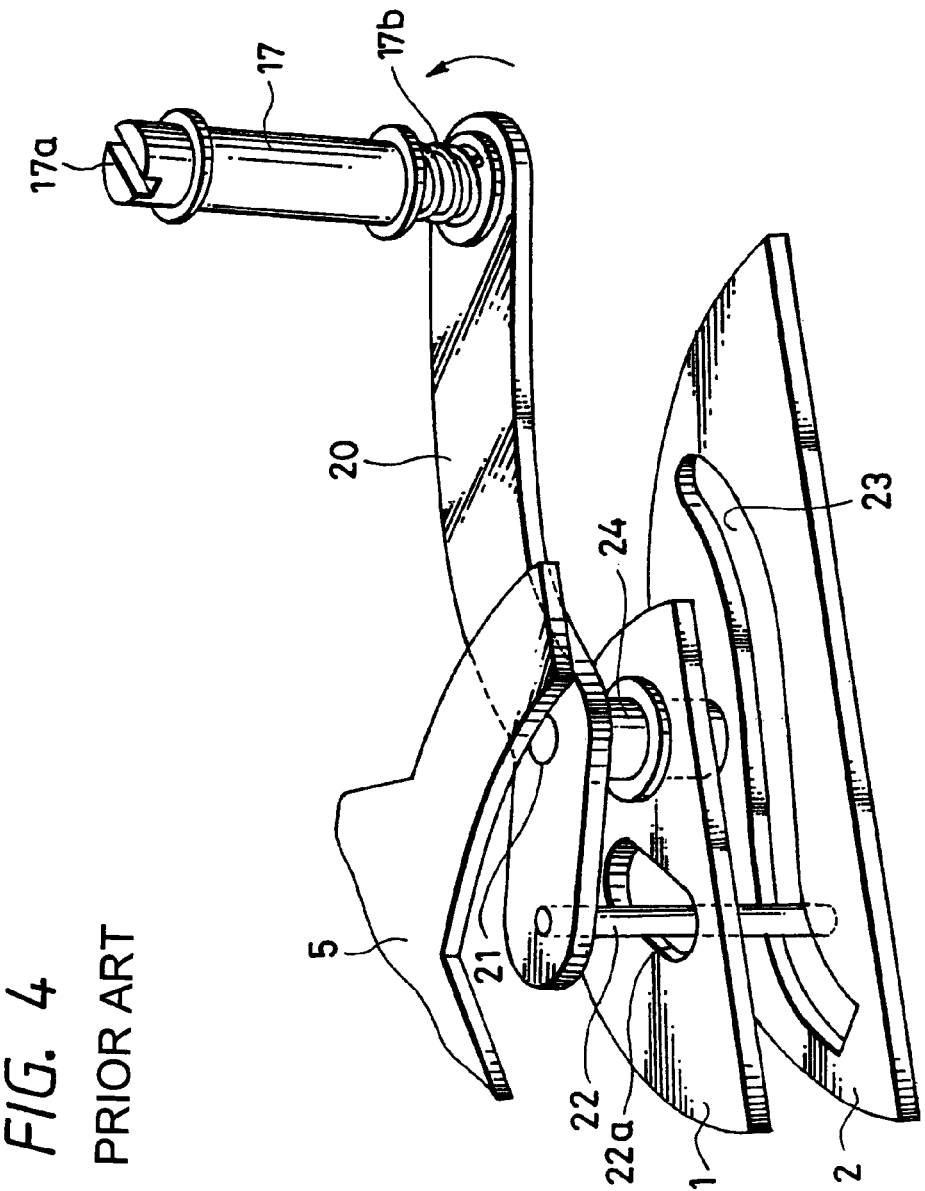
FIG. 4 is a schematic view of a tape guide arm member.
Figure 5:
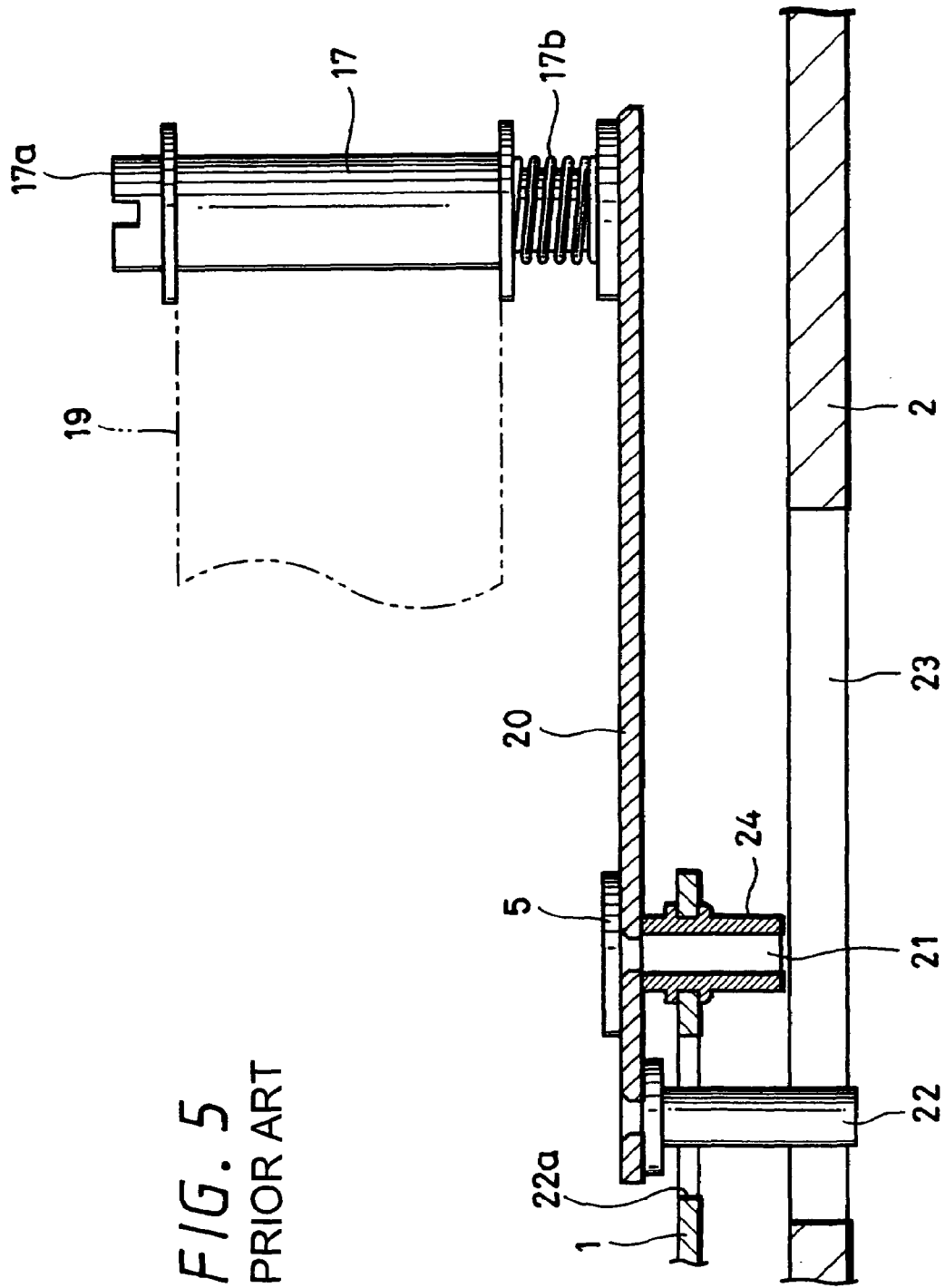
FIG. 5 is a cross sectional view of FIG. 4.

Hereinafter, an embodiment of a tape guide mechanism in a magnetic recording and reproducing apparatus of the present invention will be described with reference to drawings. In FIGS. 6 to 12, the same reference numerals are given to portions corresponding to those in FIGS. 1 to 5, and detailed explanation will be omitted.

The present invention is a tape guide mechanism in a magnetic recording and reproducing apparatus, in which when tape loading is completed to load a magnetic tape onto a rotary magnetic head and tape tension is applied to a tape guide, the tape guide is fixed at a predetermined position, so that the tape guide mechanism can be simplified.

Figure 6:
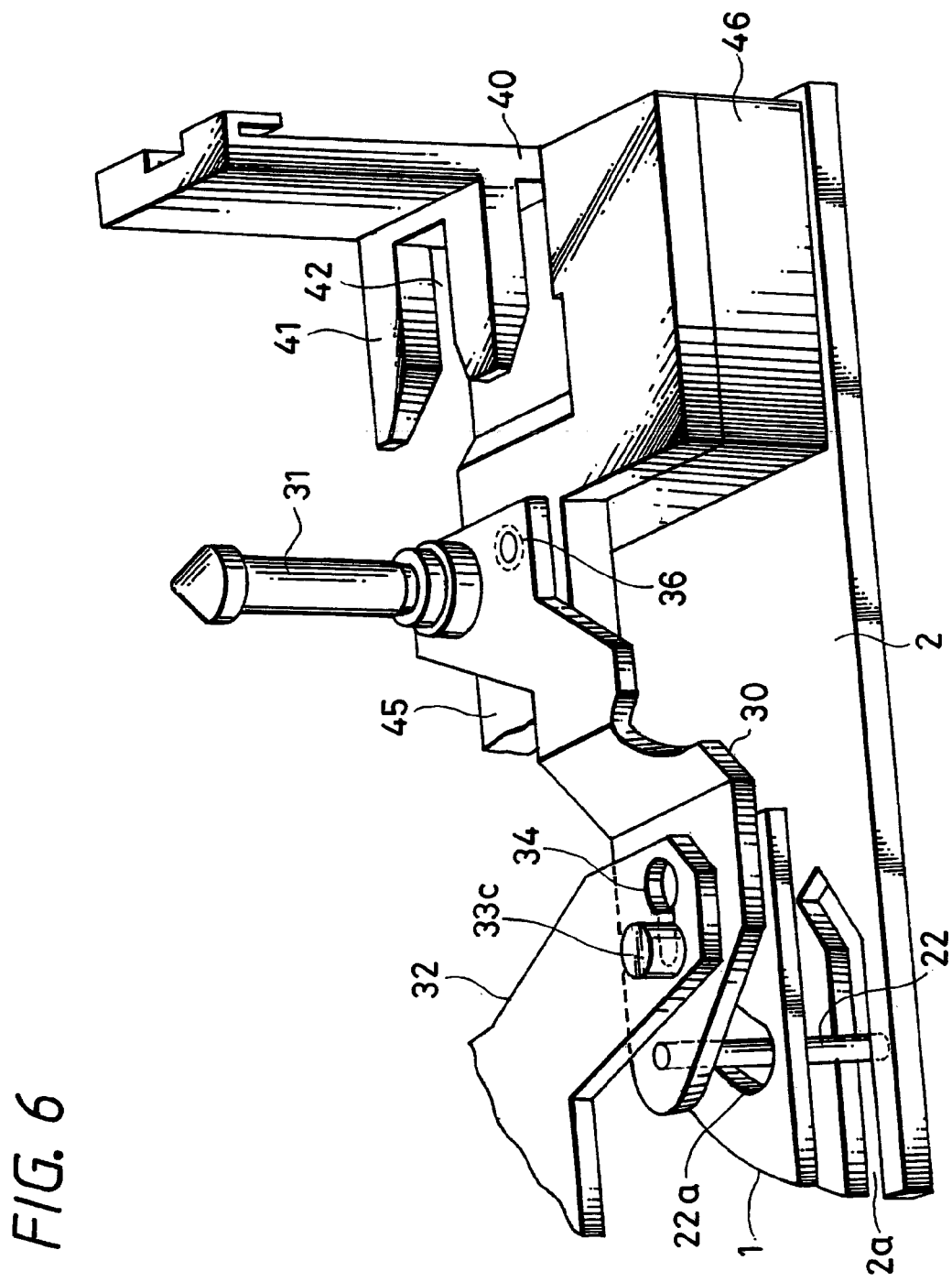
FIG. 6 is a perspective view showing an embodiment of a tape guide mechanism according to the present invention in the middle of tape loading.
Figure 7:
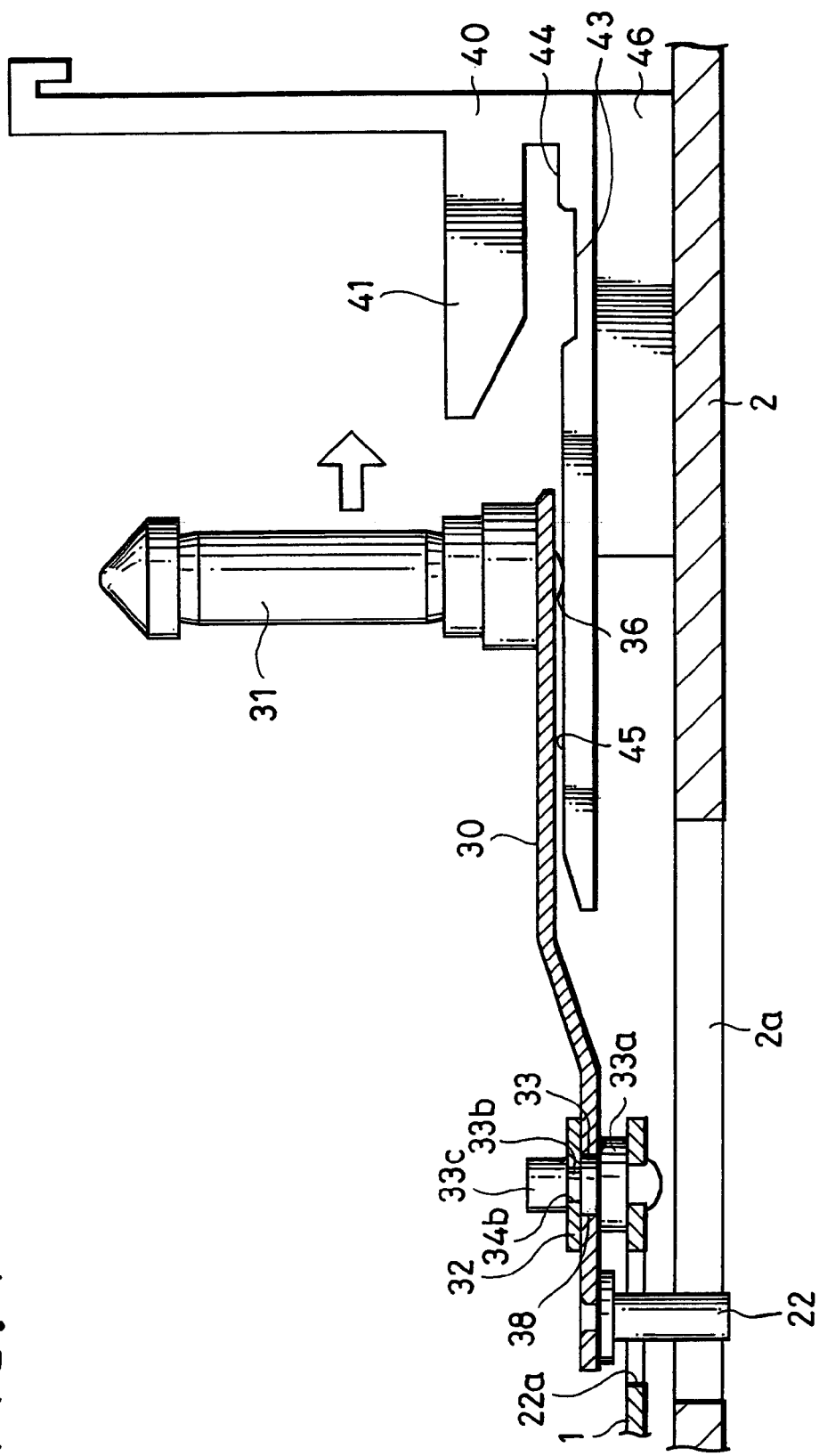
FIG. 7 is a schematic cross-sectional view of FIG. 6.

FIG. 6 is a perspective view of the tape guide mechanism in the magnetic recording and reproducing apparatus according to the present invention, showing the state in which tape loading is being performed. FIG. 7 is a schematic cross-sectional view of FIG. 6.

In FIG. 6, reference numeral 1 denotes a movable chassis; numeral 2 denotes a fixed chassis; numeral 30 denotes a tape guide arm member (hereunder termed an arm) on which an tape guide 31 is erected; and numeral 32 denotes a reel stand cover plate processed to press the tape guide arm member 30. Numeral 40 denotes a guide receiving member.

Figure 8:
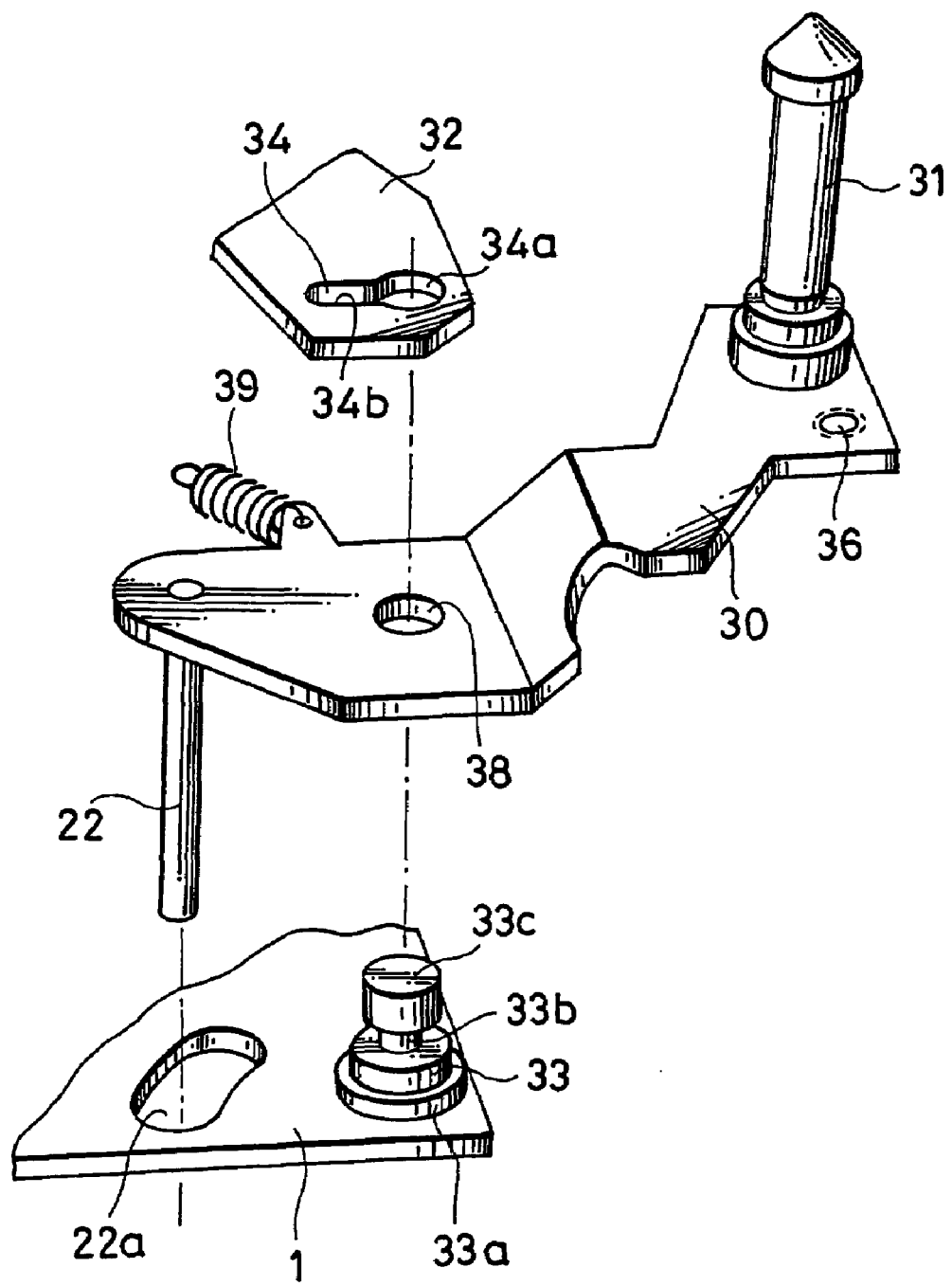
FIG. 8 is an exploded view dimensionally showing a tape guide arm member, movable chassis and reel stand cover board.

The arm 30 has a cam shaft 22 vertically provided to be inserted into a guide groove of the fixed chassis 2 through a rotation groove 22a provided on the movable chassis 1, and the cam shaft 22 moves along a guide receiving groove 2a provided in the fixed chassis 2 together with movement of the movable chassis 1. Hereupon, the arm 30 moves along the guide receiving groove 2a and also rotates in accordance with the rotation groove 22a using a fulcrum shaft 33 described later on erected on the movable chassis 1 as a rotation fulcrum. Reference numeral 39 denotes a spring means, and as shown in FIG. 8, the arm 30 is forced by the attached spring means 39.

With the above described construction, when loading a tape, the movable chassis 1 slides; the arm 30 travels along a predetermined path; and the tape guide 31 is inserted into the guide receiving groove 42 of the guide receiving portion 41 provided in the guide receiving member 40 until a predetermined position.

Further, as shown in FIG. 7, in order for the arm 30 to travel to the guide receiving groove 42 smoothly and to be prevented from greatly rattling up and down when moving toward the guide receiving groove 42 (in the arrow direction), at a position on the lower surface of the arm 30 corresponding to the position of the tape guide 31 a hemispherical joggle 36 is provided, and the joggle 36 and a touching guide portion 45 that has a planarized surface and that is integrally formed with the guide receiving member 40 on a stand 46 are made to slidably move with slightly contacting with each other.

The guide receiving member 40 is made oft for example, an engineering plastic reinforced against friction, damage or the like and is not easily worn, so that a predetermined height can be maintained to make the arm 30 stably travel.

FIG. 8 shows an exploded perspective view of the tape guide arm member, the movable chassis, and the reel stand cover plate. The arm 30 is set freely movable by means of a rotation fulcrum shaft erected on the movable chassis 1 and a bearing hole of the arm 30 and is forced in the thrust direction.

The fulcrum shaft portion of the movable chassis 1 includes on the chassis: a convex portion 33a having a larger diameter than a fulcrum shaft, on which a fulcrum shaft 33 of the rotation center of the arm 30 is provided, and a retainer shaft 33b having a diameter smaller than that of the fulcrum shaft is erected on the fulcrum shaft 33 provided with an engaging portion 33c having a diameter smaller than that of the fulcrum shaft 33 and larger than that of the retainer shaft 33b on top of the end thereof. Further, a bearing hole 38 having approximately the same diameter as the fulcrum shaft 33 is bored in the arm 30, and an engaging hole 34 that is made by joining a through hole 34a, into which the engaging portion 33c is inserted, and on one end of the through hole 34a a retaining elliptical hole 34b having a diameter smaller than that of the engaging portion 33c is bored in the reel stand cover plate 32.

First, the cam shaft 22 of the arm 30 is inserted into the rotation groove 22a and the engaging portion 33c of the movable chassis 1 is inserted into the bearing hole 38 of the arm 30 so that the bearing hole 38 and the fulcrum shaft 33 are engaged. Subsequently, the engaging portion 33c projected on the upper surface of the arm 30 is made to pass through the through hole 34a of the engaging hole 34 in the reel stand cover plate 32. Then, the reel stand cover plate 32 is made to slide in the major axis direction of the retaining elliptical hole 34b and as shown in FIG. 6 the retainer shaft 33b is passed through and fit into the retaining elliptical hole 34b so that the arm 30 is forced down by the reel stand cover plate 32 whose movement in the upward direction is restricted by the engaging portion 33c.

Requiring accuracy on engaging the fulcrum shaft 33 and the bearing hole 38 is made different from conventional examples, and is allowed to have a rattle (up to approximately 100 μm, for example); and also the length of the bearing is set to have only the plate thickness of the arm 30 compared with conventional examples in which the length of the bearing is provided as long as possible, so that the position of the tape guide 31 may not be determined by the rotation fulcrum portion.

According to the construction described above, the posture of the tape guide 31 and arm 30 in the middle of tape loading is determined with the reel stand cover plate 32 regulating the arm 30 in the thrust direction to restrain rattling within a requiring range.

Figure 9:
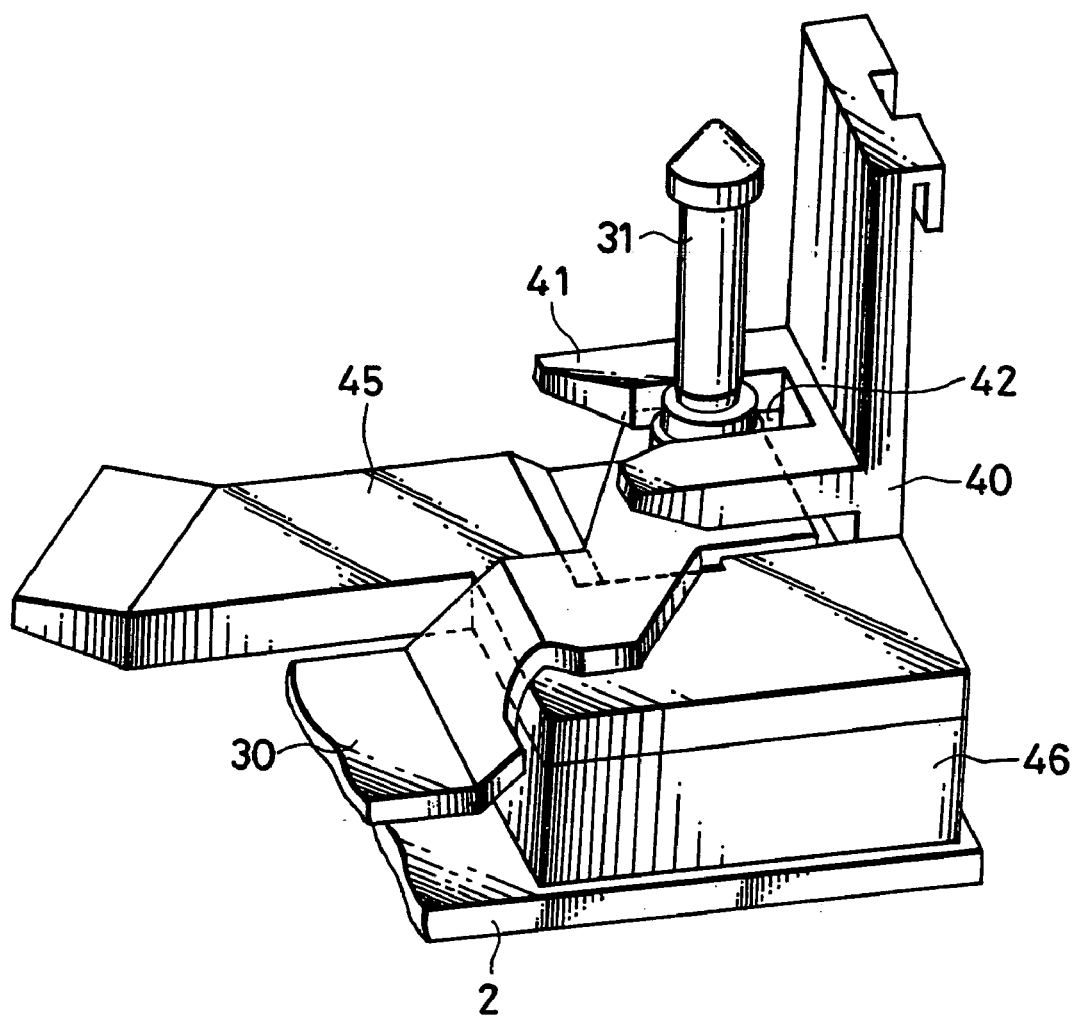
FIG. 9 is a perspective view of a tape guide mechanism showing the state in which tape loading is completed.
Figure 10A:
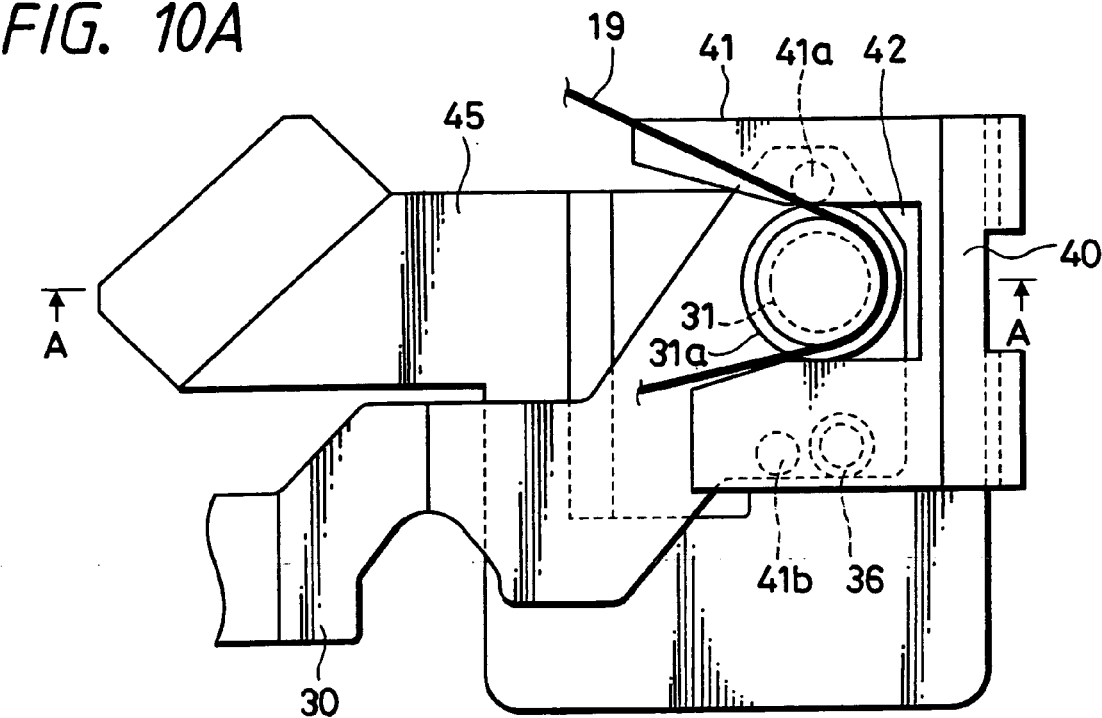
FIG. 10A is a top view of FIG. 9
Figure 10B:
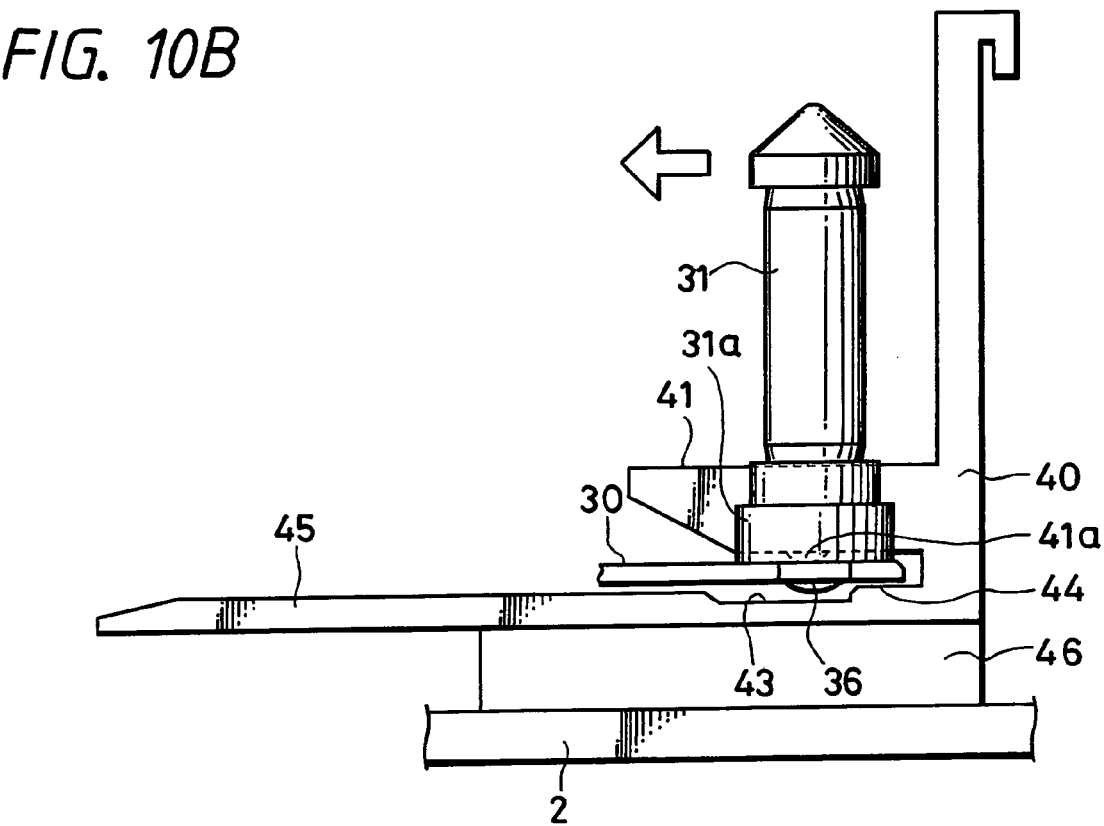
FIG. 10B is a view shown by A—A of FIG. 10A.

FIG. 9 shows the tape guide mechanism in the magnetic recording and reproducing apparatus of the present invention in the state in which tape loading is completed; and FIG. 10A shows a top view of FIG. 9 and FIG. 10B shows a view taken by A–A line of FIG. 9.

After traveling to the tape loading position, the arm 30 goes under an approximately U-shaped guide receiving portion 41, as shown in FIG. 9, and the tape guide 31 reaches the target position in the guide receiving groove 42, where the magnetic tape run stably. Since a portion around an entrance of the guide receiving portion 41 has been tapered to provide the wider entrance thereof, the tape guide 31 can smoothly enter.

As shown in FIG. 10A, a tape guide support portion 31a which supports the tape guide 31 on the arm 30 has approximately the same diameter as the width of the guide receiving groove 42, so the rattling of the tape guide 31 in the direction perpendicular to the lateral direction that is the direction of travel of the tape guide 31 in the guide receiving groove 42, can be restrained.

Figure 11:
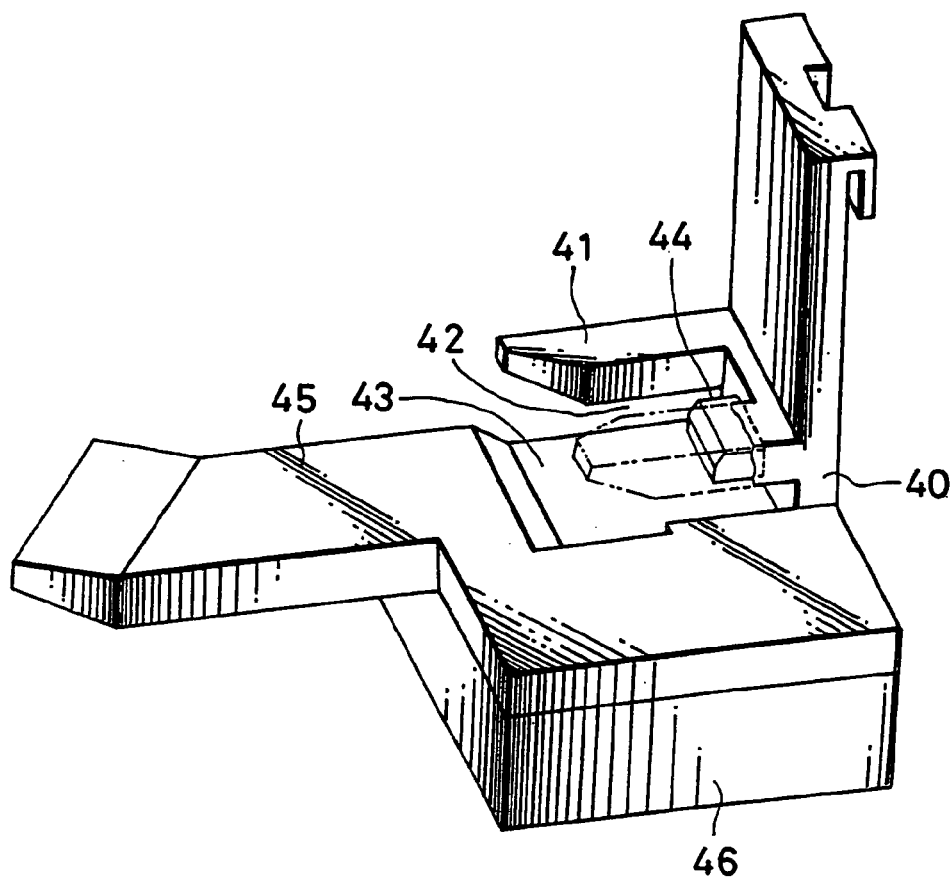
FIG. 11 is a detailed view of a guide receiving member.

Further, when the arm 30 has traveled to the tape loading position, a concave portion 43 and an upward supporting portion 44 are provided with the guide receiving member 40 as shown in detail in FIG. 11 and the joggle 36 provided on the lower surface of the arm 30 is dropped into the concave portion 43 provided correspondingly to the guide receiving member 40 and the lower end portion of the arm 30 is received by the upward supporting portion 44 of the guide receiving member 40.

With the above construction, the joggle 36 is brought into a non-contact state to be prevented from worn out; and since the joggle 36 is dropped into the concave portion 43 and the arm 30 is received by the upward supporting portion 44, the posture of the arm 30, that is, the posture of the tape guide 31 is maintained at a predetermined height. However, at this stage, the positional accuracy of the tape guide 31 has not yet been determined and has not been fixed.

Then, as shown in FIG. 10A, when the tape loading has been completed to load the magnetic tape 19 and tape tension is applied to the tape guide 31, the force in the direction indicated by an arrow in FIG. 10B is applied to the tape guide 31, so that the arm 30 having the above described rattle is slightly moved upward to come in contact with the lower surface of the guide receiving portion 41.

The above consequence can be obtained only when the arm 30 is allowed to have an appropriate rattle at the rotation fulcrum portion of the arm 30.

Figure 12:
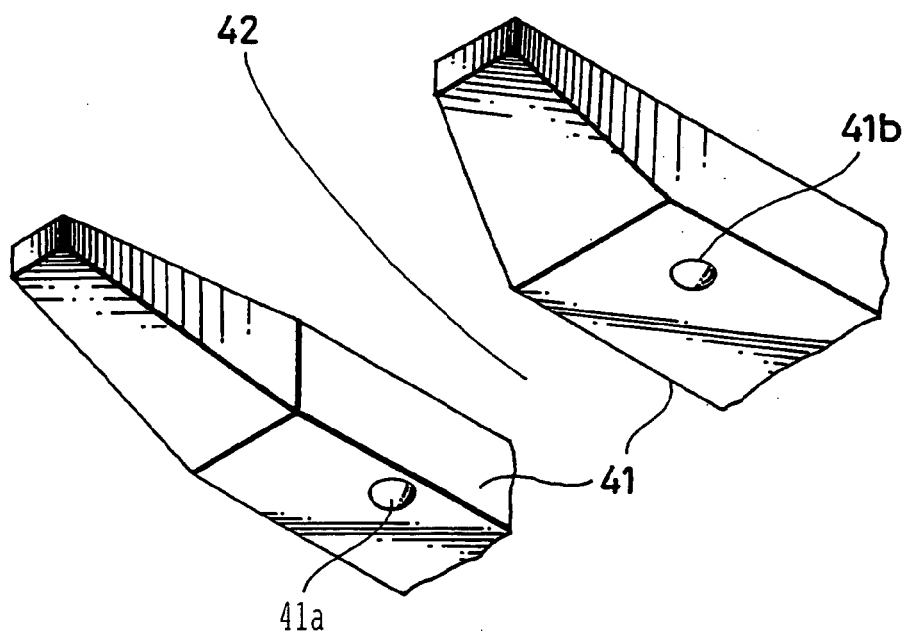
FIG. 12 is a detailed view of a guide receiving member.

FIG. 12 is a perspective view showing the lower portion of the guide receiving portion 41.

As shown in FIG. 12, projections 41a and 41b are provided at portions, which come in contact with the arm 30, on the lower surface of the guide receiving portion 41 on both sides of the guide receiving groove 42. The projections 41a and 41b come in contact with the upper surface of the arm 30, as shown in FIG. 10B, to fix the arm 30 and the height, inclination, and the like of the tape guide 31 are determined.

It is desirable that the projections 41a and 41b be designed such that as shown, for example, in FIG. 10B the straight line connecting the projections 41a and 41b is approximately perpendicular to the direction of tape tension applied to the tape guide 31, when the guide receiving member 40 is shown from above. Further, each distance from the tape guide 31 to the projections 41a and 41b, the height and dimensions of each of the projections, and the like are modified so that an appropriate position of the tape guide 31 can be obtained accordingly.

This embodiment is constructed as described above, and only when the tape tension is applied to the tape guide 31, the position of the tape guide 31 is determined using that tension, so that the accuracy of the posture of the tape guide 31 in the middle of the tape loading is not required and the structure of the tape guide arm member 30 can be simplified.

Further, there is no need to make the bearing of the rotation fulcrum portion of the tape guide arm member 30 long, so that the length thereof can be made as thin as the plate thickness of the arm member and the flexibility in design in the height direction can be improved.

Furthermore, as explained in this embodiment, in the case where the tape guide 31 is fixed at the predetermined position and a magnetic tape is taken up by the taking up side reel, the magnetic tape can directly be taken up by the reel without touching the inner guide even with a cassette having a guide inside, so that the magnetic tape can be prevented from being worn out and deteriorating.

The structure of the rotation fulcrum portion of the tape guide arm member 30 only needs to be the one in which the posture and path of the traveling tape guide 31 are determined by a cover plate such as the reel stand cover plate 32 or the like to obtain the similar effectiveness, and such a structure in which, for example, a fulcrum shaft is vertically provided on the side of a tape guide arm member and a bearing hole is provided on the movable chassis side can be considered. Further, although in the above embodiment, the relevant tape guide is the final guide immediately before taking up the magnetic tape onto a taking up side reel, this embodiment is also applicable to the other guides.

It should be noted that the present invention is not limited to the above described embodiments and various modifications are attainable without departing from the gist thereof.

INDUSTRIAL APPLICABILITY

As described above, according to the present invention, when tape tension is applied to the tape guide, the posture of a tape guide is fixed using that tape tension, so that the accuracy of posture of the tape guide is not required in the middle of the tape loading.

Accordingly, the construction of the rotation fulcrum portion of the tape guide arm member can be simplified; and the rotation fulcrum portion can be manufactured easily without using highly accurate technology and also, the production cost will be reduced.

Furthermore, with a simplified construction of the rotation fulcrum portion, there is no need to provide a long bearing, so that the design flexibility in the height direction can be improved.

Moreover, according to the present invention, when tension is applied to the tape guide, the upper surface of the tape guide arm member comes in contact with the projections on the lower surface of the guide receiving portion to fix the tape guide, so that with a simplified construction, the tape guide is fixed to the predetermined position and by slightly adjusting the projections accordingly, the tape guide can be easily fixed to the predetermined position.

The invention claimed is:

1. A tape guide mechanism of a magnetic recording and reproducing apparatus that comprises a movable chassis having a tape guide arm member on which a tape guide is erected and a pair of reels stands thereon and a fixed chassis having a magnetic rotary head thereon, in which when said movable chassis moves to one position of said fixed chassis, loading and unloading of a cassette is performed and when said movable chassis moves to the other position, a magnetic tape is taken out from the reel of the loaded cassette to perform tape loading of said magnetic tape being wound around said magnetic rotary head, wherein after completing the tape loading, said tape guide is fixed to a predetermined position by a guide receiving member having a guide receiving portion that is provided on said fixed chassis to receive the tape guide, wherein, in the middle of said tape guide traveling to said predetermined position, said tape guide arm member is made to move along a groove provided in said fixed chassis to determine the position in the chassis plane direction, and wherein the tape guide arm member is guided and moved by contact between a projection provided on a lower surface of said tape guide arm member and a surface of the guide receiving member, to determine the position in the height direction.

2. A tape guide mechanism of a magnetic recording and reproducing apparatus according to claim 1, wherein said tape guide is fixed to a predetermined position by means of tension of the magnetic tape loaded onto said tape guide.

3. A tape guide mechanism of a magnetic recording and reproducing apparatus according to claim 1, wherein said tape guide is fixed to a predetermined position by means of tension of the magnetic tape loaded onto said tape guide; and said guide receiving portion has a groove receiving said tape guide arm member and is provided with projections on the lower surface thereof, and when tension of the magnetic tape loaded onto said tape guide is applied, the upper surface of said tape guide arm member comes in contact with the projections on the lower surface of said guide receiving portion to fix said tape guide to a predetermined position.

4. A tape guide mechanism of a magnetic recording and reproducing apparatus according to claim 1, wherein on said movable chassis a convex portion having a diameter larger than that of a fulcrum shaft is provided, on the convex portion the fulcrum shaft is erected, a retainer shaft having a diameter smaller than that of the fulcrum shaft is provided and a engaging portion having a diameter smaller than that of the fulcrum shaft and larger than that of the retainer shaft is joined;

a bearing hole having approximately the same diameter as that of the fulcrum shaft is bored in said tape guide arm member;

a plate having an engaging hole including an insertion hole where the engaging portion is inserted and a retainer hole that is provided at an end of the insertion hole to be joined and that has a diameter smaller than that of the insertion hole;

the engaging portion of said movable chassis is inserted through a bearing hole of said tape guide arm member so that the bearing hole is engaged with the fulcrum shaft, the engaging portion protruding on the upper surface of said tape guide arm member is inserted into the insertion hole of the engaging portion of said plate, and said plate is slid in the major axis direction of the retainer elliptical hole to insert and fix the retainer shaft into the retainer elliptical hole; and said tape arm guide arm member is pressed by said plate whose movement in the upward direction is restrained by said engaging portion.

* * * * *